United States Patent
Choi et al.

(10) Patent No.: US 9,472,801 B2
(45) Date of Patent: Oct. 18, 2016

(54) BATTERY OVERCHARGE PROTECTION DEVICE

(71) Applicant: Hyundai Motor Company, Seoul (KR)

(72) Inventors: Sung Min Choi, Gyeongju-si (KR); Seung Ho Ahn, Seoul (KR); Hong Seok Min, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 91 days.

(21) Appl. No.: 14/457,952

(22) Filed: Aug. 12, 2014

(65) Prior Publication Data

US 2015/0188305 A1    Jul. 2, 2015

(30) Foreign Application Priority Data

Dec. 30, 2013    (KR) .......................... 10-2013-0167273

(51) Int. Cl.
| | |
|---|---|
| *H02H 3/00* | (2006.01) |
| *H01M 2/34* | (2006.01) |
| *H01M 2/06* | (2006.01) |
| *H01M 2/26* | (2006.01) |
| *H01M 2/30* | (2006.01) |
| *H01M 2/02* | (2006.01) |
| *B60L 3/04* | (2006.01) |

(52) U.S. Cl.
CPC ................ *H01M 2/34* (2013.01); *H01M 2/021* (2013.01); *H01M 2/06* (2013.01); *H01M 2/266* (2013.01); *H01M 2/30* (2013.01); *B60L 3/04* (2013.01); *H01M 2/0207* (2013.01); *H01M 2/0212* (2013.01); *H01M 2200/00* (2013.01)

(58) Field of Classification Search
USPC .................................. 361/91.1, 101
See application file for complete search history.

(56) References Cited

U.S. PATENT DOCUMENTS

| | | | |
|---|---|---|---|
| 2009/0029246 A1* | 1/2009 | Kim | ............... H01M 2/021 429/176 |
| 2013/0075242 A1* | 3/2013 | Lim | ............... H01M 2/34 200/52 R |

FOREIGN PATENT DOCUMENTS

| | | |
|---|---|---|
| JP | 10-294097 A | 11/1998 |
| JP | 2000-67846 A | 3/2000 |
| JP | 2006-185709 A | 7/2006 |
| KR | 10-2012-0064171 A | 6/2012 |
| KR | 10-2012-0064172 A | 6/2012 |
| KR | 10-2013-0014248 A | 2/2013 |
| KR | 10-1252981 B1 | 4/2013 |
| KR | 10-2013-0051166 A | 5/2013 |

(Continued)

OTHER PUBLICATIONS

Korean Notice of Allowance issued Application No. 10-2013-0167273 dated Jul. 21, 2015.

(Continued)

*Primary Examiner* — Danny Nguyen
(74) *Attorney, Agent, or Firm* — McDermott Will & Emery LLP

(57) ABSTRACT

A battery overcharge protection device includes a pouch having a battery cell packaged therein. An electrode tab extends from an end of the battery cell for allowing flow of electricity therethrough and is composed of first and second electrode tab parts. A breaker is provided in the pouch and connected to the first and second electrode tab parts to separate the first and second electrode tab parts from each other upon expansion of the battery cell.

8 Claims, 5 Drawing Sheets

(56) References Cited

FOREIGN PATENT DOCUMENTS

| KR | 10-2013-0063754 A | 6/2013 |
| KR | 10-1294179 B1 | 8/2013 |

OTHER PUBLICATIONS

Korean Office Action issued in Korean Application No. 10-2013-0167273 dated Jan. 26, 2014.

\* cited by examiner

BATTERY OVERCHARGE PROTECTION DEVICE

CROSS REFERENCE TO RELATED APPLICATION

The present application claims the benefit of priority to Korean Patent Application No. 10-2013-0167273, filed on Dec. 30, 2013, the entire contents of which is incorporated herein for all purposes by this reference.

TECHNICAL FIELD

The present disclosure relates to a battery overcharge protection device which is designed to break an electrical circuit by volume change of a battery cell thereby preventing safety accidents when the battery cell expands due to abnormal conditions such as overcharge.

BACKGROUND

With a development and extensive use of various electronic products, secondary batteries are attracting a lot of attention as an energy source for such electronic products. Lithium-ion secondary batteries have been used as a representative secondary battery. Since this kind of secondary battery contains a variety of combustible substances therein, it may present various risks in terms of safety such as heat generation and explosion.

As an example, when overcharge occurs, which is one abnormal behavior of a battery cell, the overcharge gives a rise to gas generation in the battery cell owing to a chemical reaction of cell materials. This has an adverse influence on safety of the battery owing to the increased internal volume and temperature of the battery. In particular, because a pouch type of battery has an outer shell having a low physical strength and no safety feature of cell (circuit interrupt device (CID), positive thermal coefficient (PTC), fuse or the like), there is a need to provide a solution for solving overcharge problems.

In order to solve the problems, efforts have been made to the prevention of safety accidents caused by overcharge by improving structures of cell modules or packages. However, this kind of secondary battery still involves malfunction problems. Furthermore, although improvements can completely prevent safety accidents when the pouch type of battery expands abnormally, the electrical connection is established again with a gradual decrease in the volume of the pouch after the expansion, thus causing safety accidents due to flow of electricity.

Accordingly, there is a need to provide an improved technology capable of ensuring a high overcharge protection ability in the pouch type of secondary battery.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art. The present disclosure provides a battery overcharge protection device which is designed to break an electrical circuit by volume change of a battery cell thereby preventing safety accidents when the battery cell expands due to abnormal conditions such as overcharge.

According to one aspect of the present disclosure, a battery overcharge protection device includes a pouch having a battery cell packaged therein. An electrode tab extends from an end of the battery cell for allowing flow of electricity therethrough and is composed of first and second electrode tab parts. A breaker is provided in the pouch and is connected to the first and second electrode tab parts to separate the first and second electrode tab parts from each other upon expansion of the battery cell.

The breaker may include a first breaking part attached to an internal surface of the pouch and connected to the first electrode tab part. A second breaking part is attached to another internal surface of the pouch to face the first breaking part and is connected to the second electrode tab part, the second breaking part is electrically connected to the first breaking part.

The first breaking part may include a first head securely attached to the one internal surface of the pouch and a first connector extending from the first head and electrically connected to the first electrode tab part. The second breaking part may include a second head securely attached to the other internal surface of the pouch and a second connector extending from the second head and electrically connected to the second electrode tab part. The first and second breaking parts may be electrically connected to each other when the first and second heads come into contact with each other.

The first head of the first breaking part may include a terminal pin extending toward the second head, and the second head of the second breaking part may include a terminal hole corresponding to the terminal pin of the first head.

The terminal pin of the first head may include a plural number of terminal pins, and the terminal hole of the second head may include the same number of terminal holes as that of the plurality of terminal pins.

The first and second connectors may be configured not to come into contact with each other when the first and second breaking parts are electrically connected to each other.

The first connector of the first breaking part may extend from a lateral surface of the first head and the second connector of the second breaking part may extend from a lateral surface of the second head such that the first connector is arranged parallel to the second connector.

The battery overcharge protection device may further include a recoupling preventer which is connected at one end thereof to the first breaking part and is connected at the other end thereof to the second breaking part so as to bias the first and second heads away from each other in a direction perpendicular to the fitting direction of the first and second heads.

The recoupling preventer may be an elastic member which is connected at one end thereof to the first head of the first breaking part and is connected at the other end thereof to the second head of the second breaking part so as to bias the first and second heads away from each other.

BRIEF DESCRIPTION OF THE DRAWINGS

The above and other objects, features and other advantages of the present disclosure will be more clearly understood from the following detailed description when taken in conjunction with the accompanying drawings.

DETAILED DESCRIPTION

Hereinbelow, a battery overcharge protection device according to an exemplary embodiment of the present disclosure will be described in detail with reference to the accompanying drawings.

Figure 1:
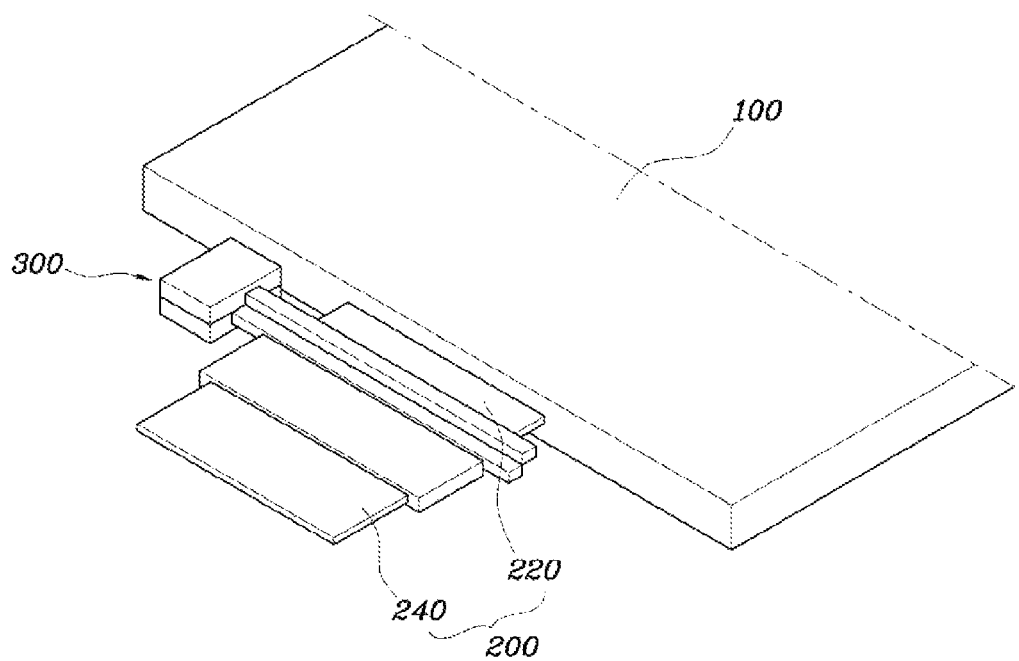
FIG. 1 is a perspective view illustrating a battery overcharge protection device according to an embodiment of the present disclosure.
Figure 2:
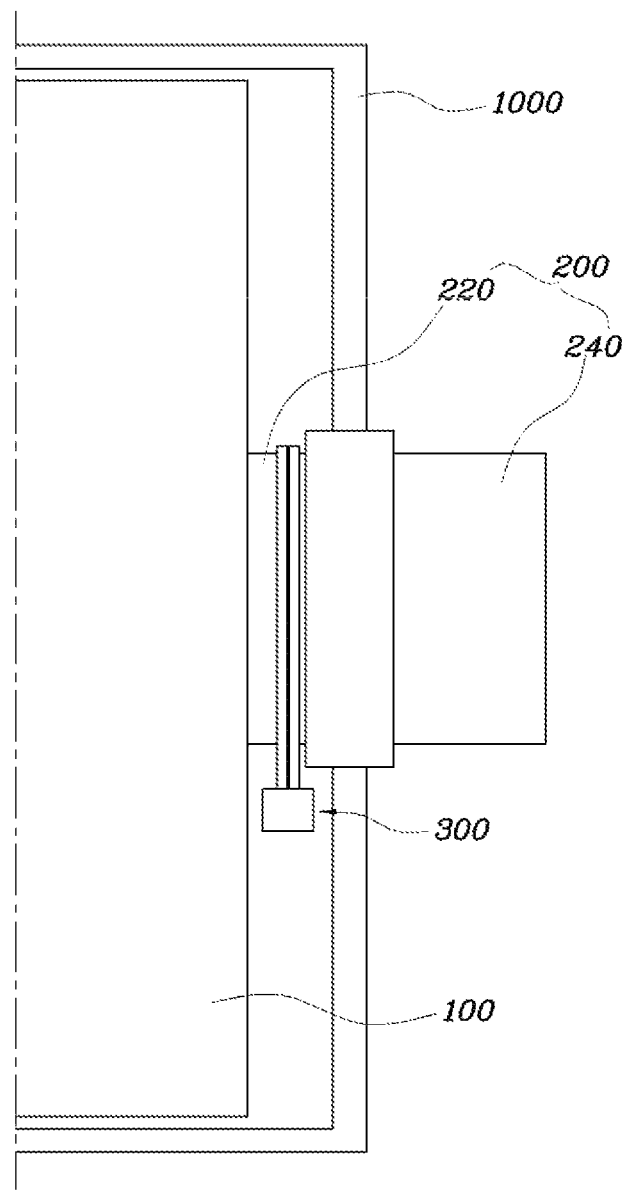
FIG. 2 is a plan view illustrating a battery overcharge protection device shown in FIG. 1.
Figure 3:
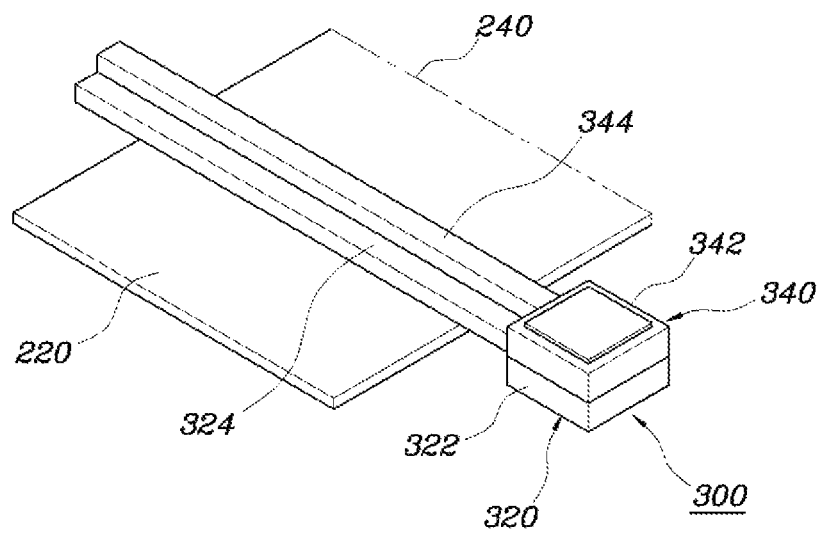
FIGS. 3 and 4 are perspective views illustrating a breaker of a battery overcharge protection device according to an embodiment of the present disclosure.
Figure 4:
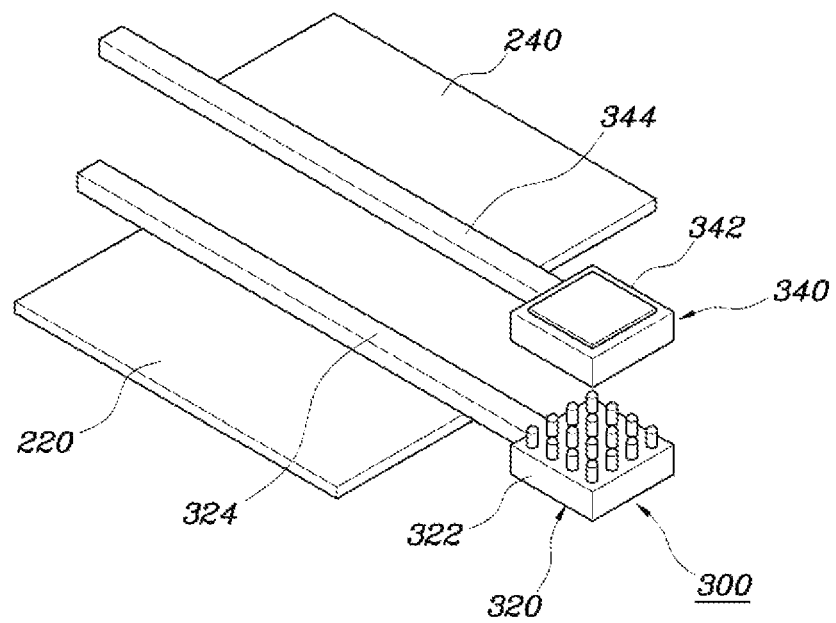
Figure 5:
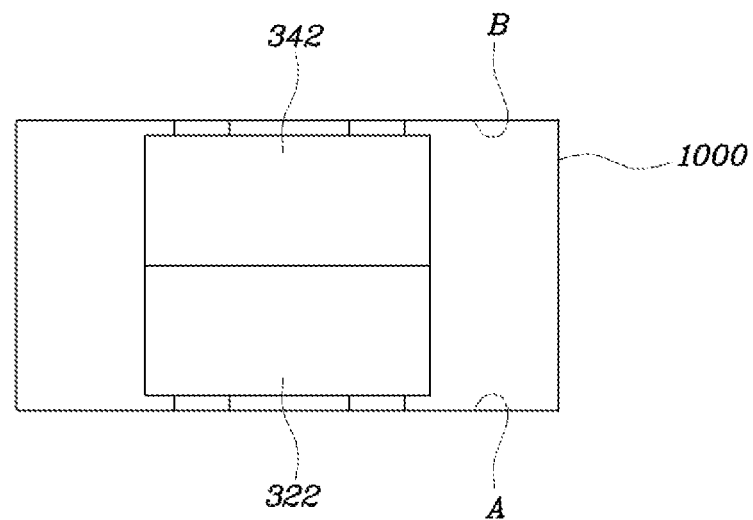
FIGS. 5 and 6 are cross-sectional views illustrating an operation of a breaker of a battery overcharge protection device according to an embodiment of the present disclosure.
Figure 6:
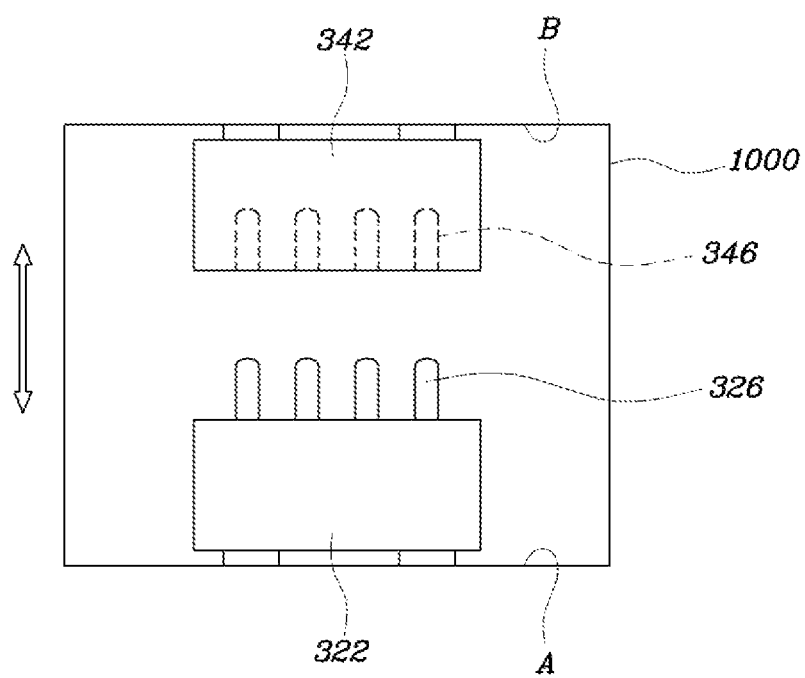

FIG. 1 is a perspective view illustrating a battery overcharge protection device according to an embodiment of the present disclosure. FIG. 2 is a plan view illustrating the battery overcharge protection device shown in FIG. 1. FIGS. 3 and 4 are perspective views illustrating a breaker of the battery overcharge protection device according to an embodiment of the present disclosure. FIGS. 5 and 6 are cross-sectional views illustrating an operation of the breaker of the battery overcharge protection device according to the embodiment of the present disclosure.

The battery overcharge protection device according to an embodiment of the present disclosure includes a pouch 1000 with a battery cell packaged therein. An electrode tab 200 extends from an end of the cell 100 for allowing electricity to flow therethrough, and is composed of a first electrode tab part 220 and a second electrode tab part 240. A breaker is provided in the pouch 1000 and is connected to the first and second electrode tab parts 220, 240 of the electrode tab 200 such that the first and second electrode tab parts 220, 240 are disconnected from each other at the time of expansion of the battery cell.

The battery overcharge protection device of the embodiment may be applied to automotive fuel cells as well as secondary batteries, and may be applied to various battery technological fields for assuring a safety structure.

In pouch cell structures, when overcharge occurs due to a usual behavior of a battery cell, the battery cell 100 generates therein gas resulting from chemical reaction, which causes a volume expansion and increases the pressure and temperature of the battery cell 100, resulting in safety accidents caused by generation of heat and thus explosion.

According an exemplary embodiment, the overcharge protection device, which prevents safety accidents thanks to breakage of an electrical circuit and interruption of the flow of electricity caused by volume change of the pouch 1000 upon expansion of the battery cell 100, is provided in the pouch 1000, which is advantageous in the layout of the battery cell. Furthermore, the embodiment provides assurance of the safety since it can interrupt the flow of electricity before the operation of interrupting the flow of electricity in a conventional overcharge protection technology used in cell module or package type battery.

As shown in FIGS. 1 and 2, the overcharge protection device according to the embodiment includes the pouch 1000 equipped with the batter cell 100 packaged therein. Since the configurations of the battery cell 100 and the pouch 1000 are obvious to those skilled in the art, the detailed description thereof will be omitted.

According to the embodiment, the electrode tab 200, which extends from the end of the battery cell 100 for allowing electricity to flow therethrough, is composed of the first and second electrode tab parts 220, 240. Specifically, the connection between the first and second electrode tab parts 220, 240 enables electricity to flow therethrough, whereas the flow of electricity is interrupted by disconnection between the first and second electrode tab parts 220, 240 caused by the breaker 300 when the battery cell 100 expands due to the overcharge. The first and second electrode tab parts 220, 240, which are separately constructed in this manner, are connected to each other or disconnected from each other through the breaker 300, thus enabling the interruption of the flow of electricity upon expansion of the battery cell.

The portion of the electrode tab 200 at which the first and second electrode tab parts 220, 240 are separated from each other is positioned in the pouch 1000. The battery overcharge protection device according to the embodiment is configured to interrupt the flow of electricity by the volume expansion of the pouch 1000. In particular, the breaker 300 is configured to perform the interrupting function upon expansion of the pouch 1000. The separated portion between the first and second electrode tab parts 220, 240 is positioned in the pouch 1000. The breaker 300, which is provided in the pouch 1000, is connected between the first and second electrode tab parts 220, 240 of the electrode tab 200 such that the first and second electrode tab parts 220, 240 are disconnected from each other upon expansion of the battery cell 100.

More specifically, the first and second electrode tab parts 220, 240 are electrically connected to each other the breaker 300, and are disconnected from each other by means of the breaker 300 that functions to interrupt the flow of electricity between the first and second electrode tab parts 220, 240 thus breaking the electrical connection therebetween upon expansion of the battery cell 100. In other words, the breaker 300 according to the embodiment is configured to enable the first and second electrode tab parts 220, 240 to be electrically connected to each other in normal conditions, but to cause the first and second electrode tab parts 220, 240 to be disconnected from each other upon expansion of the battery cell 100, thus breaking the electrical connection therebetween.

As shown in FIGS. 3 and 4, the breaker 300 according to an exemplary embodiment includes a first breaking part 320 which is attached to an internal surface A of the pouch 1000 (see FIGS. 5 to 8) and is connected to the first electrode tab part 220. A second breaking part 340 is attached to another internal surface B of the pouch 1000 opposed to the first breaking part 320 and is connected to the second electrode tab part 240, wherein the second breaking part 340 is electrically connected to the second breaking part 340. Specifically, the breaker 300 according to the embodiment is composed of the separated first and second breaking parts 320, 340. Referring to FIG. 5, the first breaking part 320 is securely attached to the internal surface A of the pouch 1000, whereas the second breaking part 340 is securely attached to the opposed internal surface B to face the first breaking part 320.

In this context, the first electrode tab part 220 is connected to the first breaking part 320, and the second electrode tab part 240 is connected to the second breaking part 340. In the normal case where the battery cell 100 normally functions, the first and second breaking parts 320, 340 are in contact with each other and thus electrically connected to each other, thus allowing electricity to flow between the first and second electrode tab parts 220, 240.

When the battery cell 100 expands due to the overcharge, the volume of the pouch 1000 increases. At this point, as the volume of the pouch 1000 increases, the first and second breaking parts 320, 340 are spaced apart from each other in a direction of expansion of the pouch 1000, thus breaking the electrical connection between the first and second electrode tab parts 220, 240, as shown in FIG. 6.

The breaker 300 will now be more concretely described. The first breaking part 320 is composed of a first head 322 securely attached to the internal surface A of the pouch 1000 and a first connector 324 extending from the first head 322 and electrically connected to the first electrode tab part 220. Second breaking part 340 is composed of a second head 342 securely attached to the opposed internal surface B of the pouch 1000, and a second connector 344 extends from the second head 342 and electrically is connected to the second electrode tab part 240. The first and second breaking parts 320, 340 are electrically connected to each other when the first and second heads 342 come into contact with each other.

The first head 322 of the first breaking part 320 and the second head 342 of the second breaking part 340 each have a predetermined surface area such that the first and second head 322, 342 are securely attached to internal surfaces of the pouch 1000. Electrical terminals are provided on the mating faces of the first and second heads 322, 342, so that electricity flows between the first and second heads 322, 342 when the electrical terminals come into contact with the corresponding electrical terminals. As the first and second breaking parts 320, 340 are electrically connected to each other when the first and second heads 322, 342 come into contact with each other, the first electrode tab part 220 is electrically connected to the second electrode tab part 240, thus allowing electricity to flow inside the battery cell 100 from the outside.

In the meantime, when the battery cell 100 expands due to the overcharge, the first and second heads 322, 342, which are provided on the mating faces of the first and second breaking parts 320, 340, respectively, are separated from each other due to the increased volume of the pouch 1000, thus breaking the electrical connection between the first and second electrode tab parts 220, 240.

In an embodiment, the first head 322 of the first breaking part 320 may be provided with terminal pins 326 that extend toward the second head 342, and the second head 342 of the second breaking part 340 may be provided with terminal holes 346 that correspond to the terminal pins 326 of the first head 322. The terminal pins 326 provided on the first head 322 and the terminal holes 346 provided in the second head 342 are configured such that the contact between the terminal pins 326 and the terminal holes 346 allows electricity to flow therebetween. When the terminal pins 326 of the first head 322 are fitted into the corresponding terminal holes of the second head 342, a fastening force between the first and second heads 322, 342 increases. As a result, the first and second heads 322, 342 may keep the electrical connection therebetween without being separated from each other unless the battery cell 100 expands.

In an exemplary embodiment, the terminal pins 326 may be provided on the first head 322 in a plural number, and the terminal holes 346 may be provided in the second head 342 in the same number as that of the terminal pins 326. As in the embodiment, when the terminal pins 326 of the first head 322 and the terminal holes 346 of the second head 342 are provided in the plural number and the first and second breaking parts 320, 340 are connected to each other, a more reliable flow of electricity between the first and second electrode tab parts 220, 240 can be achieved. Furthermore, since the fastening force between the first and second heads 322, 342 is increased, the terminal pins 326 of the first head 322 are separated from the terminal holes 346 of the second head 342 thus causing breakage of the electrical connection therebetween when the pouch 1000 expands in a sufficient amount.

The first and second connectors 324, 344 may be configured such that the first and second connectors 324, 344 are spaced apart from each other without contact therebetween when the first and second breaking parts 320, 340 are electrically connected to each other. In this embodiment, the electrode tab 200 is composed of the first and second electrode tab parts 220, 240 which are separated from each other. The first and second electrode tab parts 220, 240 are connected to each other in the normal operation, but are separated from each other upon expansion of the battery cell 100.

In this regard, the first electrode tab part 220 is connected to the first connector 324 of the first breaking part 320, and the second electrode tab part 240 is connected to the second connector 344 of the second breaking part 340. The first and second electrode tab parts 220, 240 are electrically connected to each other when the first head 322 connected to the first connector 324 comes into contact with the second head 342 connected to the second connector 344. In other words, the first and second electrode tab parts 220, 240 are electrically connected to each other when the first head 322 of the first breaking part 320 comes into contact with the second head 342 of the second breaking part 340. If the first and second connectors 324, 344 are configured to be in contact with each other, there may be no breakage of the electrical connection because the first and second electrode tab parts 220, 240 are in electrical connection even when the battery cell 100 expands.

Accordingly, the first and second connectors 324, 344 need no contact therebetween even in the normal conditions of the battery cell 100, and the electrical connection between the first and second electrode tab parts 220, 240 is achieved only by the contact between the first and second heads 322, 342. To this end, the first connector 324 of the first breaking part 320 extends from a lateral surface of the first head 322 and the second connector 344 of the second breaking part 340 extends from a lateral surface of the second head 342 such that the first connector 324 is arranged parallel to the second connector 344 without contacting therebetween.

In this way, since the first and second connectors 324, 344 extend in parallel to each other, there is no direct electrical connection between the first and second connectors 324, 344, and the first and second electrode tab parts 220, 240 may be electrically connected only when the first and second heads 322, 342 are in contact with each other. When the battery cell 100 and thus the pouch 1000 expand, the first and second heads 322, 342 are separated from each other, and thus, the electrical connection between the first and second electrode tab parts 220, 240 is broken.

Figure 7:
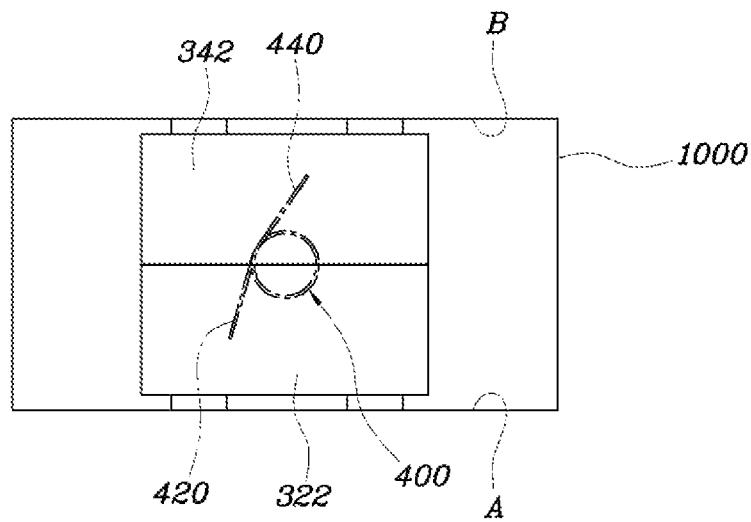
FIGS. 7 and 8 are cross-sectional views illustrating operations of a breaker and a recoupling preventer of a battery overcharge protection device according to an embodiment of the present disclosure.

As shown in FIG. 7, the battery overcharge protection device according to the embodiment may further include a recoupling preventer 400 which is connected at one end 420 thereof to the first breaking part 320 and is connected at the other end 440 thereof to the second breaking part 340 so as to bias the first and second heads 322, 342 away from each other in a direction perpendicular to the fitting direction of the first and second heads 322, 342 after the separation of the first and second heads 322, 342. The recoupling preventer 400 may be an elastic member which is connected at one end thereof to the first head 322 of the first breaking part 320 and is connected at the other end thereof to the second head 342 of the second breaking part 340 so as to bias the first and second heads 322, 342 away from each other.

The recoupling preventer 400 may be an elastic member which is connected at one end thereof to the first head 322 of the first breaking part 320 and is connected at the other end thereof to the second head 342 of the second breaking part 340 so as to bias the first and second heads 322, 342 away from each other. When abnormal conditions of the battery cell 100 such as overcharge arises, the volume of the pouch 1000 increases due to the expansion of the battery cell 100, with the result that the first head 322 of the first breaking part 320 and the second head 342 of the second breaking part 340, which are attached to the opposite internal surfaces of the pouch 1000, are separated from each other. At this point, owing to the gas expansion of the pouch 1000, the pouch 1000 bursts and thus an element sealing the pouch is damaged. As a result, the gas in the battery cell 100 releases from the pouch 1000 to the outside and thus the volume of the pouch 1000 decreases, which may cause the first and second heads 322, 342 to come into contact with each other again.

The recoupling preventer 400, which is designed to overcome the problems, is connected at one end 420 thereof to the of first head 322 of the first breaking part 320 and is connected at the other end 440 thereof to the second head 342 of the second breaking part 340 so as to bias the first and second heads 322, 342 away from each other in a direction perpendicular to the fitting direction of the first and second heads 322, 342.

Figure 8:
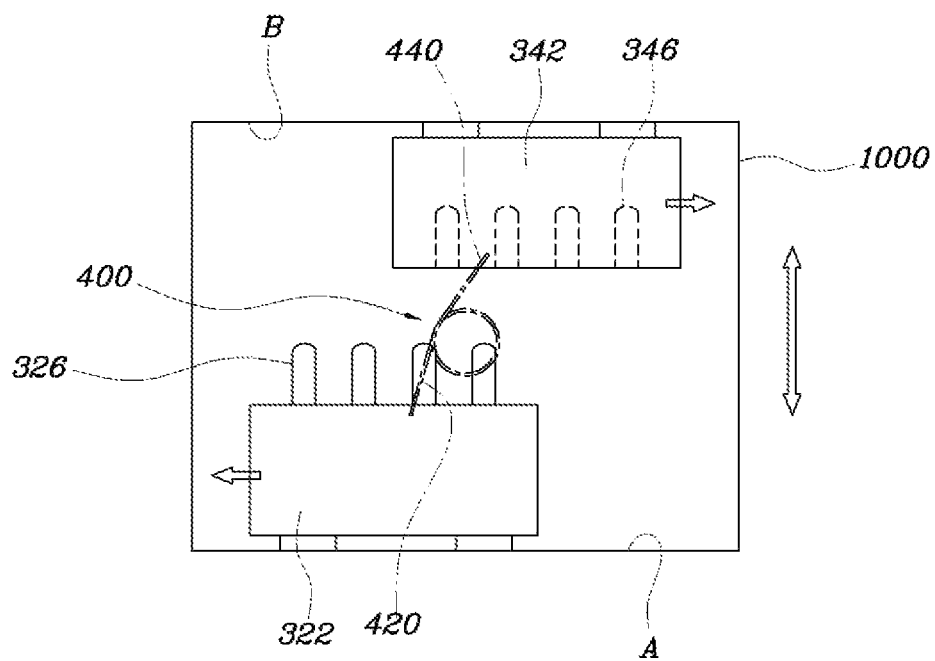

As shown in FIG. 8, when the volume of the pouch 1000 increases, the first head 322 of the first breaking part 320 is separated from the second head 342 of the second breaking part 340. The recouping preventer 400 then pushes the first and second heads 322, 342 to cause both the heads to be displaced away from each other in a direction perpendicular to the fitting direction of the first and second heads 322, 342. Consequently, even if the pouch 1000 shrinks again after the expansion thereof, the first head 322 cannot come into contact with the second head 342 again, thus preventing problems caused by the expansion of the pouch 1000.

The battery overcharge protection device according to the embodiment of the present disclosure, which is constructed in the way described above, can prevent accidents by breaking the electrical circuit through the volume change of the battery cell 100 when the battery cell 100 expands due to abnormal conditions such as overcharge.

Furthermore, since the battery overcharge protection device is provided in the pouch 1000 to break the electrical circuit of the battery upon expansion of the battery cell 100, it is not necessary to provide an additional space required to incorporate the battery overcharge protection device. In addition, since the first electrode tab part 220 cannot be electrically connected to the second electrode tab part 240 again even when the volume of the pouch 1000 decreases due to release of gas in the pouch that is generated by the overcharge, it is possible to provide more reliable safety.

Although an exemplary embodiment of the present disclosure has been described for illustrative purposes, those skilled in the art will appreciate that various modifications, additions, and substitutions are possible, without departing from the scope and spirit of the invention as disclosed in the accompanying claims.

What is claimed is:

1. A battery overcharge protection device, comprising:
   a pouch having a battery cell packaged therein;
   an electrode tab extending from an end of the battery cell for allowing flow of electricity therethrough, and composed of first and second electrode tab parts; and
   a breaker provided in the pouch and connected to the first and second electrode tab parts to separate the first and second electrode tab parts from each other upon expansion of the battery cell,
   wherein the breaker comprising: a first breaking part attached to an internal surface of the pouch and connected to the first electrode tab part; and a second breaking part attached to another internal surface of the pouch to face the first breaking part and connected to the second electrode part, the second breaking part being electrically connected to the first breaking part, and
   wherein the first and second electrode tab parts are separated from each other in the pouch.

2. The battery overcharge protection device according to claim 1, wherein the first breaking part comprises a first head securely attached to the one internal surface of the pouch and a first connector extending from the first head and electrically connected to the first electrode tab part,
   wherein the second breaking part comprises a second head securely attached to the other internal surface of the pouch and a second connector extending from the second head and electrically connected to the second electrode tab part, and
   wherein the first and second breaking parts are electrically connected to each other when the first and second heads come into contact with each other.

3. The battery overcharge protection device according to claim 2, wherein the first head of the first breaking part includes a terminal pin extending toward the second head, and the second head of the second breaking part includes a terminal hole corresponding to the terminal pin of the first head.

4. The battery overcharge protection device according to claim 3, wherein the terminal pin of the first head includes a plural number of terminal pins, and the terminal hole of the second head includes the same number of terminal holes as that of the terminal pins.

5. The battery overcharge protection device according to claim 2, wherein the first and second connectors are configured not to come into contact with each other when the first and second breaking parts are electrically connected to each other.

6. The battery overcharge protection device according to claim 5, wherein the first connector of the first breaking part extends from a lateral surface of the first head and the second connector of the second breaking part extends from a lateral surface of the second head such that the first connector is parallel to the second connector.

7. The battery overcharge protection device according to claim 2, further comprising: a recoupling preventer which is connected at one end thereof to the first breaking part and is connected at another end thereof to the second breaking part so as to bias the first and second heads away from each other in a direction perpendicular to a fitting direction of the first and second heads.

8. The battery overcharge protection device according to claim 7, wherein the recoupling preventer is an elastic member which is connected at one end thereof to the first head of the first breaking part and is connected at the other end thereof to the second head of the second breaking part so as to bias the first and second heads away from each other.

\* \* \* \* \*